Sept. 21, 1943.  F. J. WESTROPE  2,329,802
FOLDABLE VEHICLE TOP
Filed Dec. 1, 1941   6 Sheets-Sheet 2
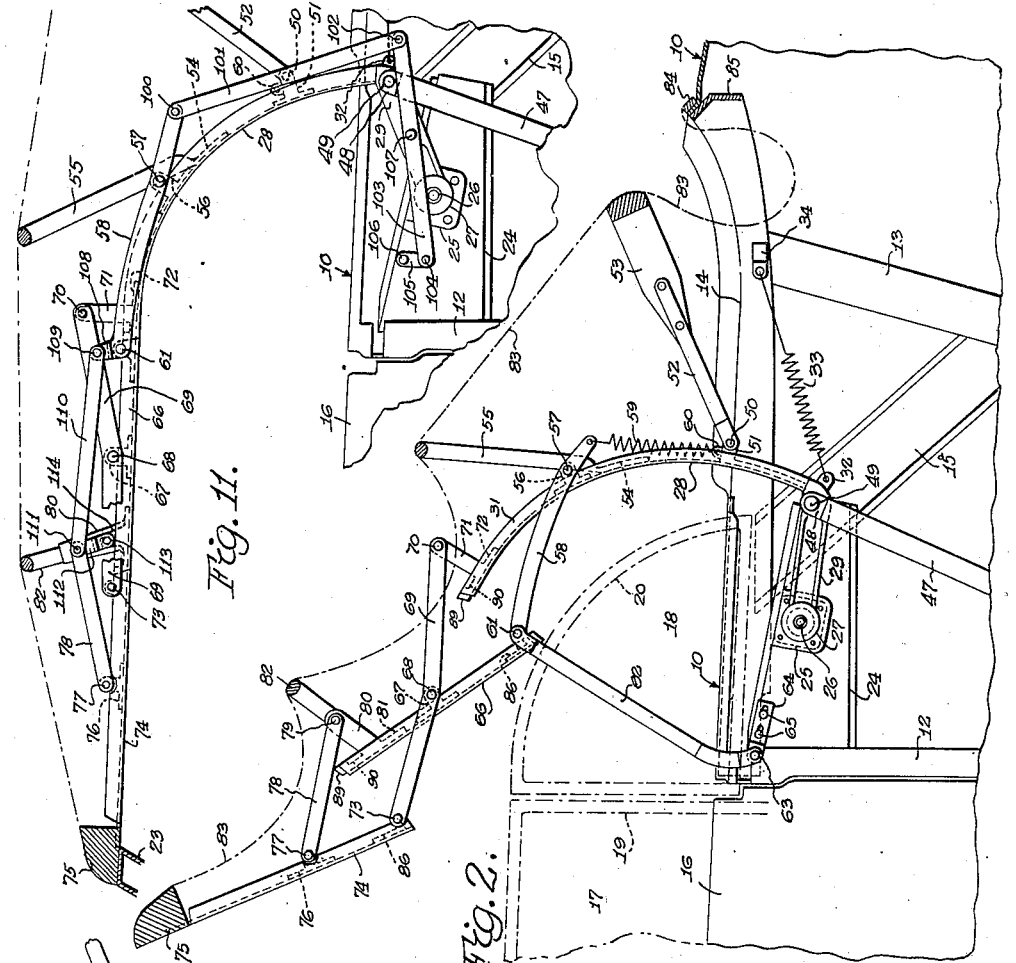
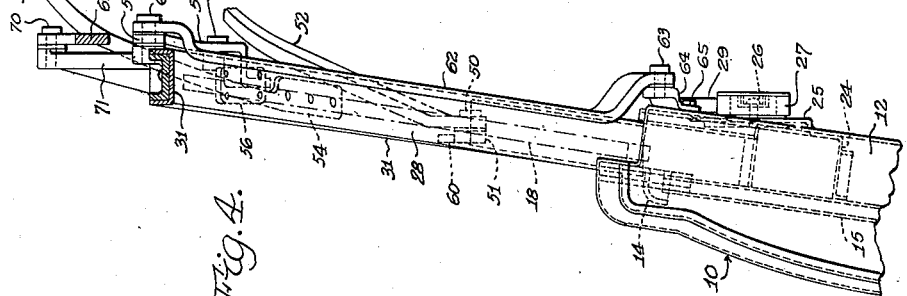
Inventor
Frederick J. Westrope, deceased
Isabel D. Westrope, administratrix
By Barthel & Bugbee
Attorneys

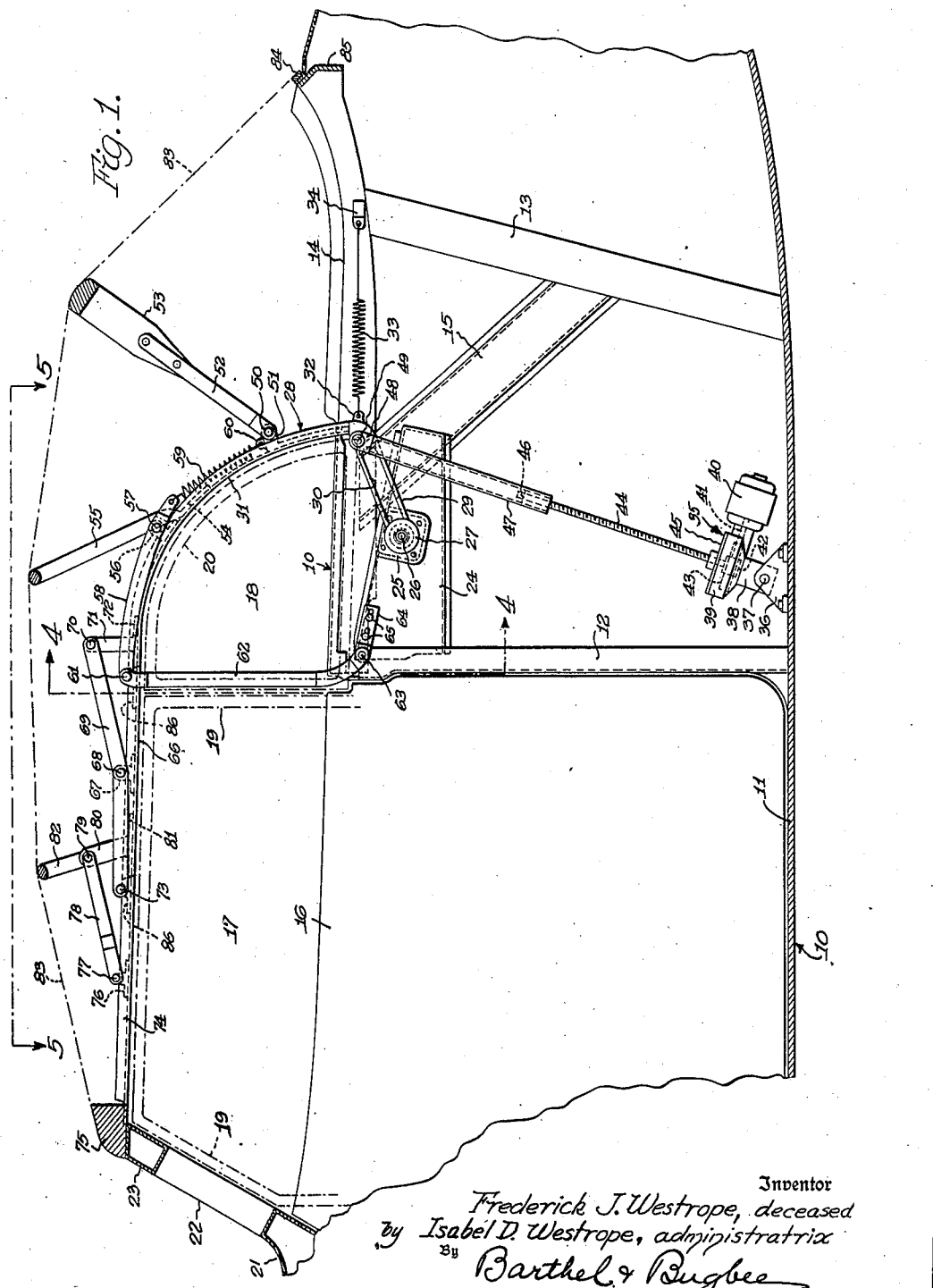

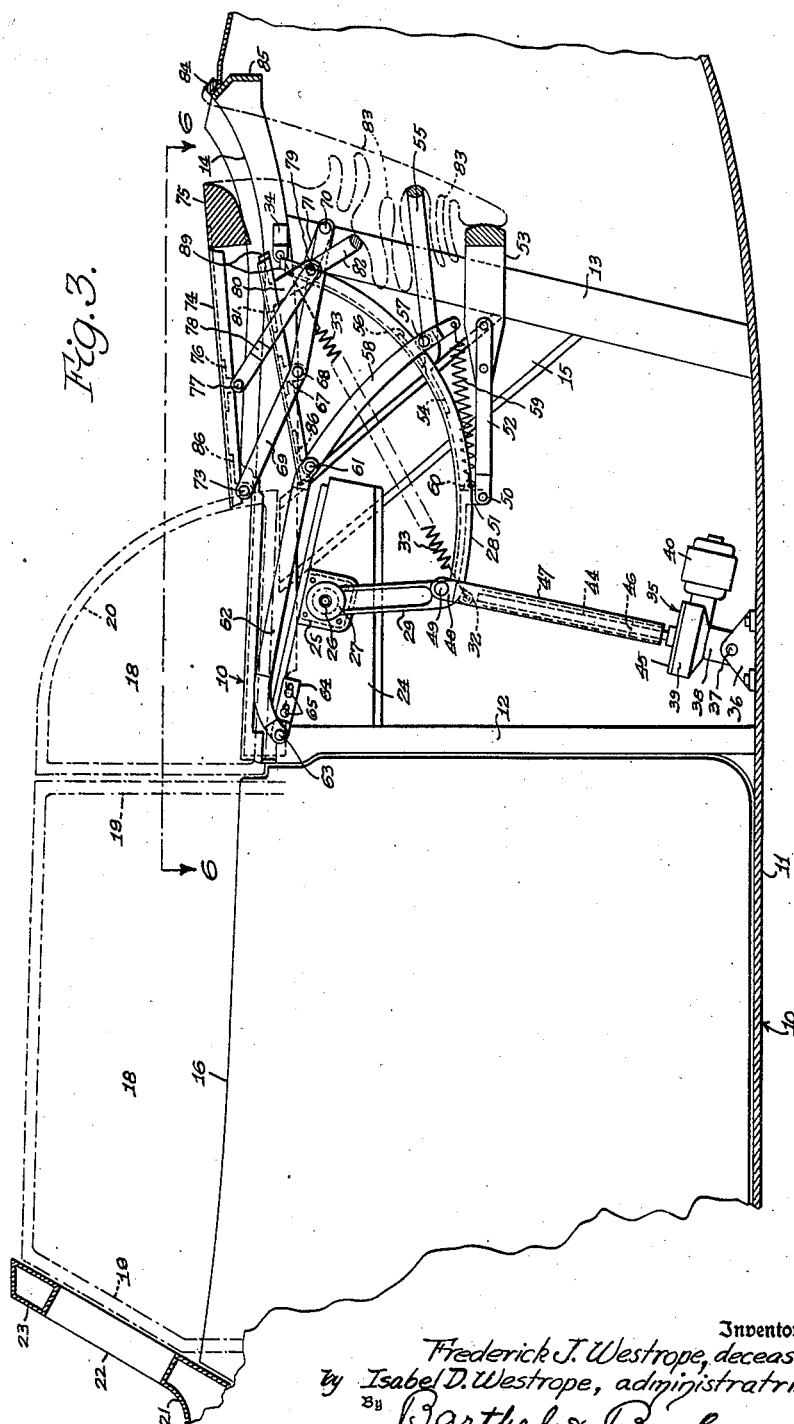

Sept. 21, 1943.   F. J. WESTROPE   2,329,802
FOLDABLE VEHICLE TOP
Filed Dec. 1, 1941   6 Sheets-Sheet 4
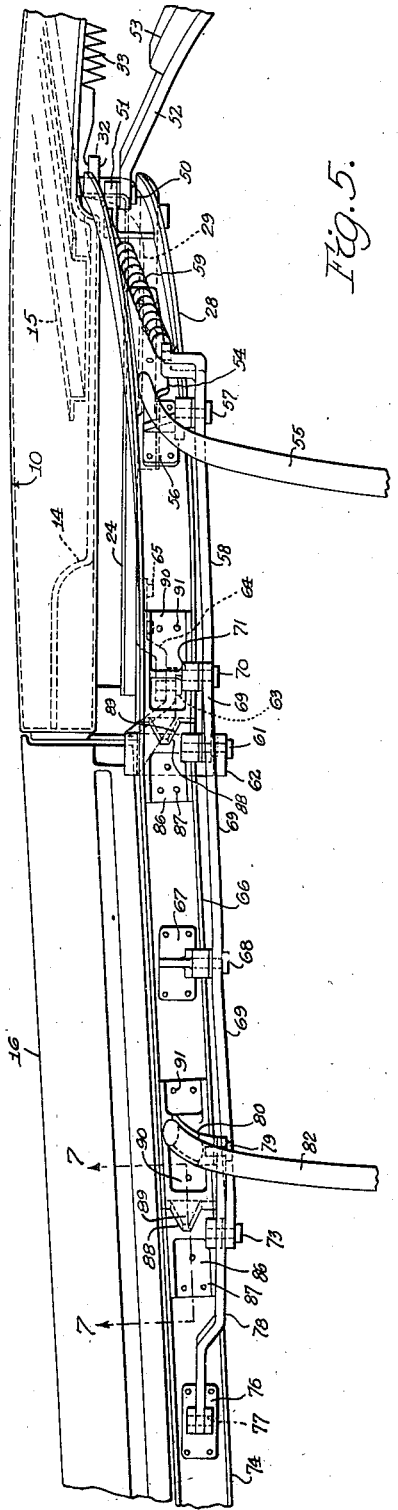
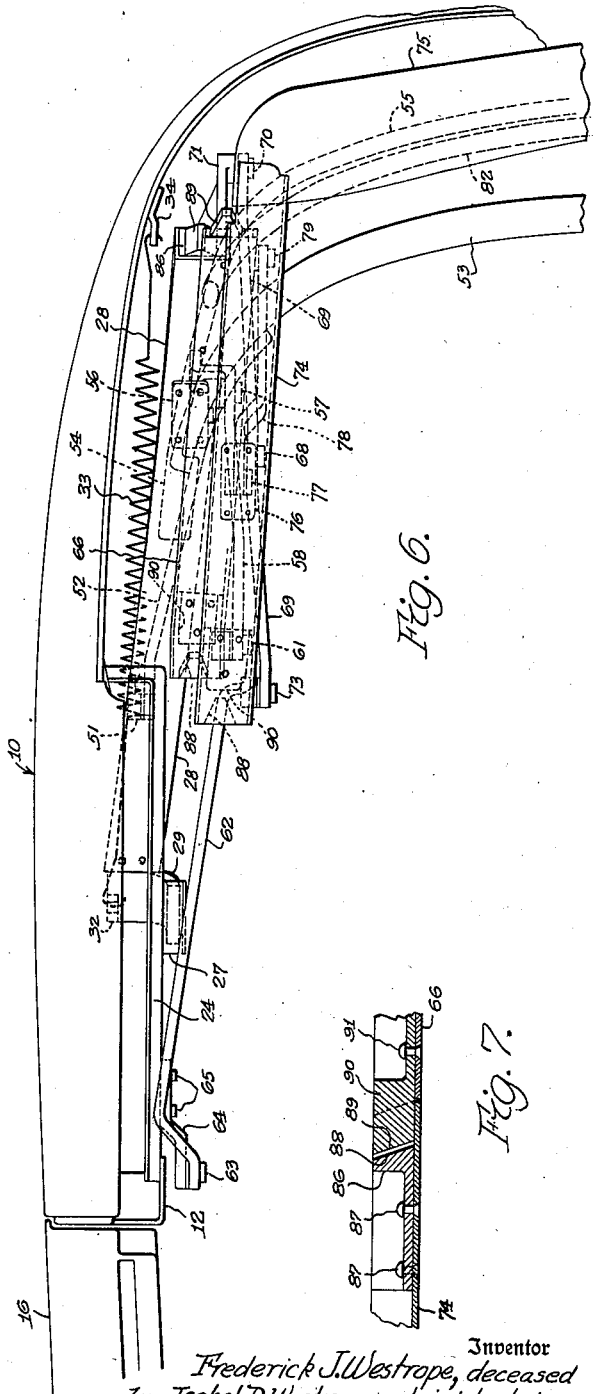
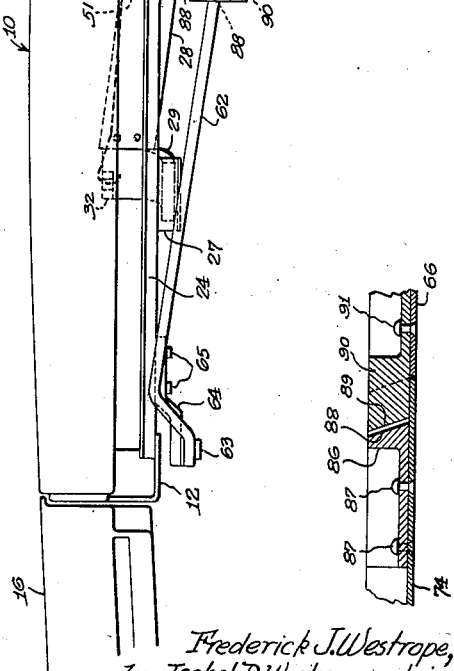
Inventor
Frederick J. Westrope, deceased
by Isabel D. Westrope, administratrix
By Barthel & Bugbee
Attorneys

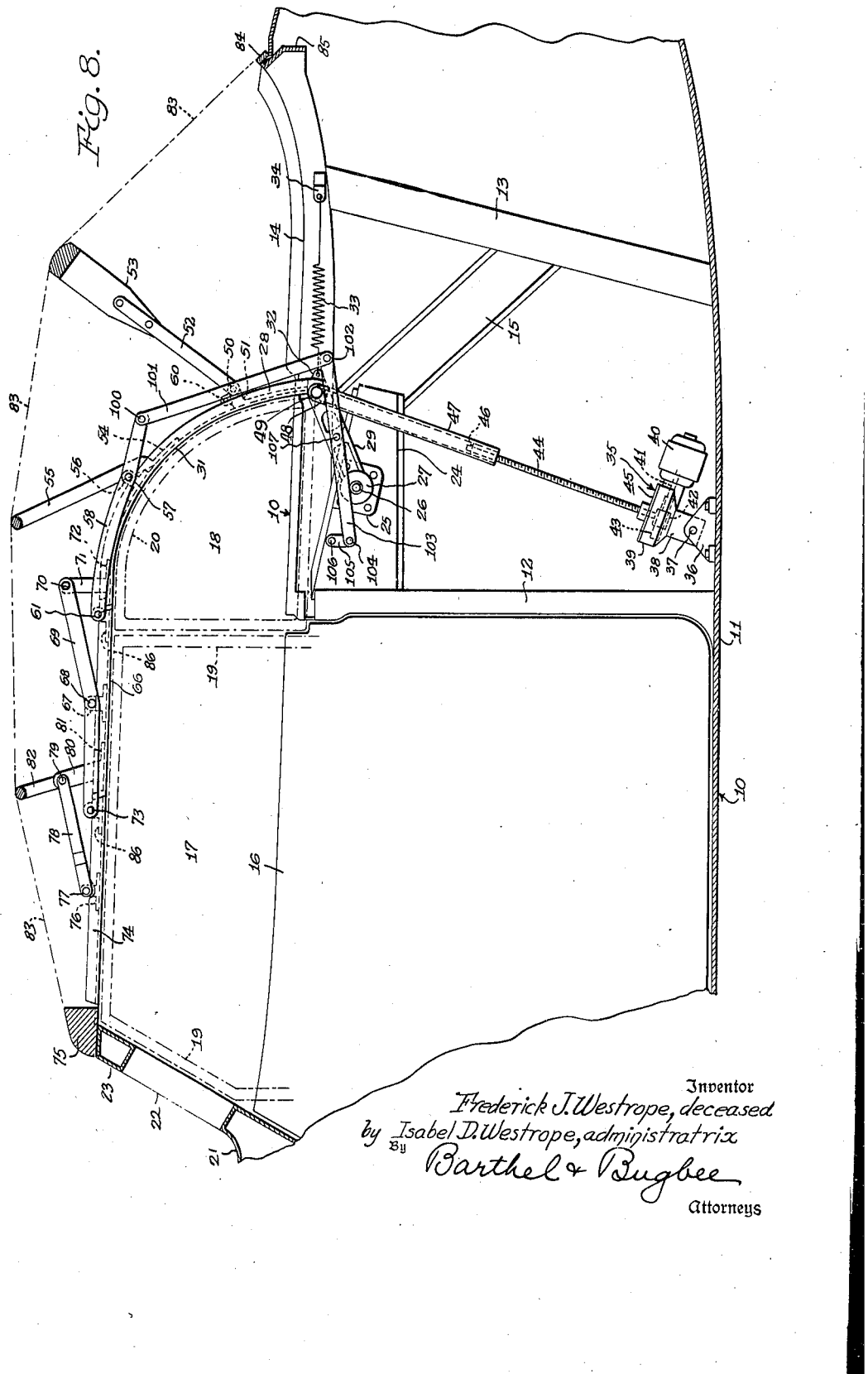

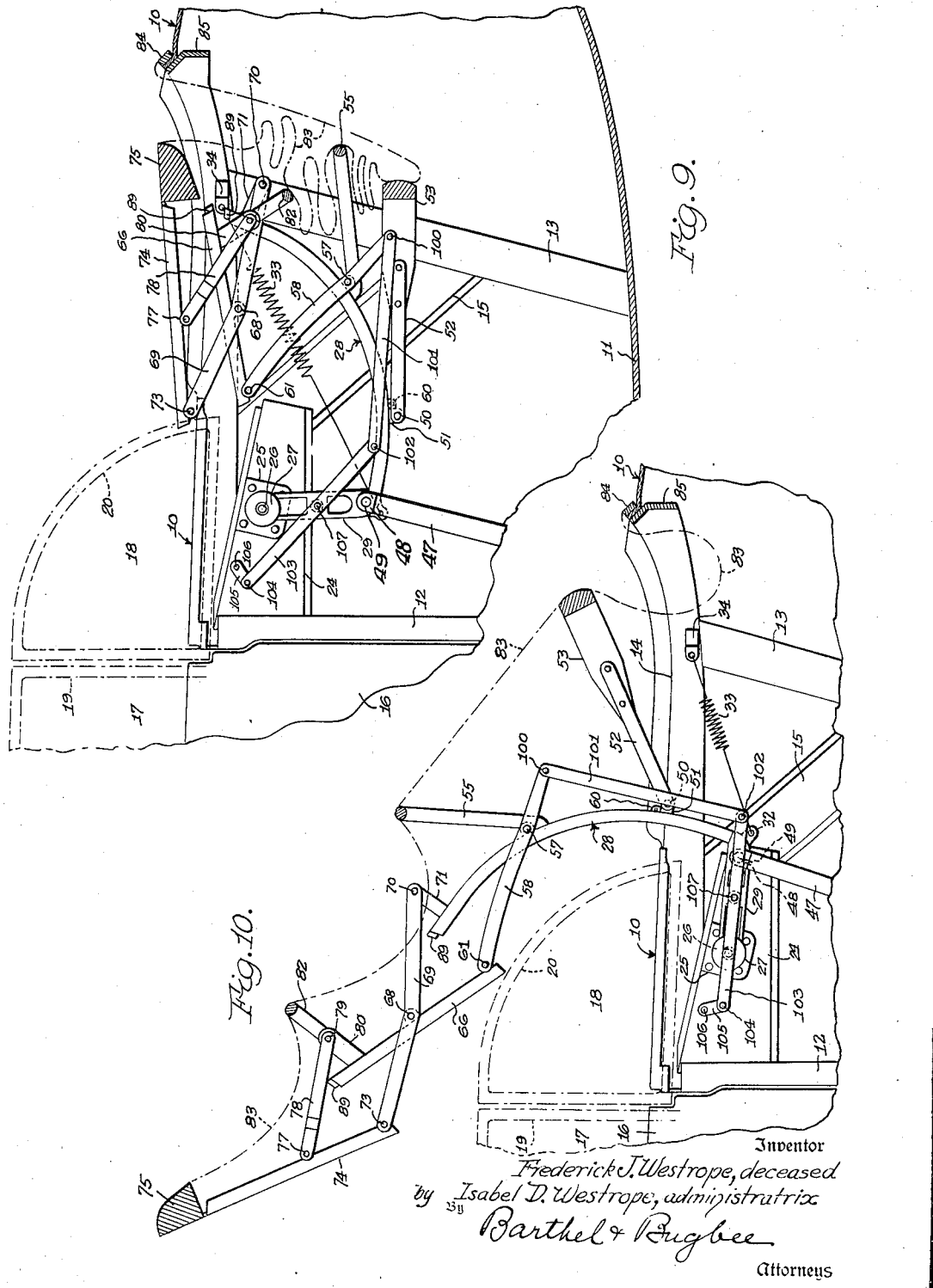

Patented Sept. 21, 1943

2,329,802

UNITED STATES PATENT OFFICE 2,329,802

FOLDABLE VEHICLE TOP

Frederick J. Westrope, deceased, late of Pleasant Ridge, Mich., by Isabel D. Westrope, administratrix, Pleasant Ridge, Mich., assignor to F. L. Jacobs Company, Detroit, Mich., a corporation of Michigan Application December 1, 1941, Serial No. 421,097

19 Claims. (Cl. 296—117)

This invention relates to vehicle tops and, in particular to foldable vehicle tops.

One object of the invention is to provide a foldable vehicle-top which will not buckle or "break" at its joints when its outriggers are pulled downwardly.

Another object is to provide a foldable vehicle top wherein the forward top bow or header is forced more firmly into engagement with the windshield header as the force applied in raising the top is continued after it reaches its raised position.

Another object is to provide a foldable vehicle top especially well adapted for power operation, and so constructed and arranged that if the motor continues running after the top has reached its fully raised position, the action of the motor will merely result in forcing the forward top bow more firmly into contact with the windshield header instead of causing them to buckle, as in prior art top frames.

Another object is to provide a foldable vehicle top as set forth in the preceding objects wherein improved means is provided to transmit the lifting force from the motor to the forward outriggers and to reduce the power ordinarily consumed in passing through the various links and levers, thereby pressing the forward top bow firmly into engagement with the windshield header with a minimum expenditure of power.

Another object is to provide a foldable vehicle-top frame which is free from the pillar arms or pillar extensions ordinarily positioned at the rearward edges of the front windows thereby eliminating these top frame members which interfere with vision and are unsightly when the windows are lowered.

Another object is to provide a foldable vehicle top frame as set forth in the preceding objects, wherein an approximately C-shaped rear arm and an improved arrangement of links and levers enables the elimination of the pillar arms or pillar extensions ordinarily extending upward to the top frame adjacent the rearward edge of the front window.

In the drawings:

Figure 1 is a central longitudinal section through a vehicle body equipped with a non-buckling foldable vehicle top according to one embodiment of the invention, with the top in its raised position;

Figure 2 is a view similar to Figure 1, but with the top in a partially lowered position;

Figure 3 is a view similar to Figures 1 and 2, but with the top in a fully lowered position;

Figure 4 is a vertical section looking rearwardly adjacent the pillar arm of the foldable vehicle top of Fig. 1, taken along the line 4—4 in Fig. 1;

Figure 5 is a top plan view of one side of the foldable vehicle top of Fig. 1 in its fully raised position, looking in the direction of the line 5—5 in Fig. 1;

Figure 6 is a top plan view of one side of the foldable vehicle top in its fully lowered position of Fig. 3, looking in the direction of the line 6—6 in Fig. 3;

Figure 7 is a fragmentary longitudinal section through the joint between the forward and intermediate outriggers taken along the line 7—7 in Fig. 5;

Figure 8 is a central longitudinal section through a modified form of non-buckling foldable vehicle top wherein the pillar arm is omitted, with the top in its fully raised position;

Figure 9 is a view similar to Fig. 8, but with the modified top in its fully lowered position;

Figure 10 is a view similar to Fig. 8, but with the modified top in a partially lowered position;

Figure 11 is a view similar to Fig. 3, but of a further modification wherein improved means is provided for transmitting the power through the linkage to the forward outriggers.

General arrangement

The foldable vehicle top of this invention consists of an improved system of links and levers so arranged that pressure exerted thereon in the vicinity of the joint between the forward outrigger after the top has reached its raised position merely has the effect of forcing the forward top bow more firmly against the windshield header instead of causing the top frame to buckle or "break" at this joint. This buckling has been a serious problem and disadvantage in prior art foldable tops, especially in the recent use of power for raising and lowering the tops.

Hitherto, the foldable tops in common use buckle at the joints between the forward and intermediate outriggers when the operator pulls downward upon the top frame in the vicinity of these joints, so that the top tends to collapse under the influence of such a downwardly-exerted force. Similar buckling has occurred when the motor use to raise the top has been permitted to continue running after the top has reached its fully raised position. In such prior tops, the pressure exerted by the forward top bow against the windshield header is frequently insufficient to maintain proper engagement between these members.

The foldable top frame of the present invention solves this problem in such a way that the overrunning of the motor or a pulling downward at the joint between the forward and intermediate outriggers does not cause the top frame to buckle or collapse, but, on the contrary, urges the forward top bow more firmly into engagement with the windshield header. The form shown in Fig. 1 employs a pillar arm or pillar extension adjacent the rear edge of each forward window but prevents this collapsing or buckling under the above mentioned circumstances. The modified form shown in Fig. 8 similarly prevents this collapsing or buckling, yet does so without the provision of such pillar arms or pillar extensions. The further modification of Fig. 11 provides additional frame members for more efficiently transmitting the power from the top-raising motor to the forward top bow so that less power is lost in the top frame system, and so that the front top header is more firmly urged to engagement with the windshield header for the same application of power by the motor or motors.

Top structure using pillar arms

Referring to the drawings in detail, Figs. 1 to 7 inclusive show a motor vehicle body, generally designated 10, and having a floor 11 from the opposite sides of which rise body pillars 12. Also rising from opposite sides of the floor 11 are rear body posts 13 connected to the body pillars 12 by the longitudinal body members 14 and additionally connected thereto by the diagonal braces 15 of approximately channel cross-section.

The body 10 is provided with front doors 16 having front window panes 17 slidable up and down from chambers located within the doors 16. Also movable upward and downward from the body 10 to the rear of the front doors 16 are rear window panes 18. The window panes 17 and 18 may have plain edges, or they may be provided with edge frames 19 and 20 respectively (Fig. 1). Rising from the cowl 21 at the forward edge of the front door 16 is the windshield 22 having an upper windshield header 23. The rearward portion of the body 10 behind the rearward windows 18 provides a compartment for receiving the top in its lowered position (Fig. 3).

Extending rearwardly from the body pillars 12 toward the diagonal braces 15 are approximately horizontal body frame members 24 of approximately channel cross-section. Mounted on each body member 24 is a bracket 25 serving as a base for a pivot pin or shaft 26. The latter pivotally supports the lower end 27 of a C-shaped arm 28 having a lower portion 29 which is longitudinally slotted as at 30. This construction is duplicated on opposite sides of the body 10. The C-shaped arm 28 is provided with a curved upper portion 31 integral with and rigidly attached to the lower portion 29. Each C-shaped arm 28 is provided with an ear 32 adjacent the rearward end of the lower portion 29, and serving as an anchorage for the forward end of a coil-spring 33, the rearward end of which is anchored to a bracket 34 secured to the longitudinal body members 14 (Fig. 14).

The C-shaped arms 28 are the foundation members to which the remaining links and bows are principally connected, and are raised and lowered by power-operated lifting mechanisms generally designated 35 and duplicated on opposite sides of the body 10. The lifting mechanism 35 consist of brackets 36, bolted to the body floor 11 and carrying pivot pins or shafts 37 upon which the downward extension 38 of the gear casings 39 are pivotally mounted (Figs. 1 and 3). Also mounted upon each gear casing 39 and movable as a unit therewith is an electric motor 40 having a drive-shaft 41 connected to a worm 42 meshing with a worm gear 43 rotatably mounted in the interior of the gear casing 39. The worm gear 43 is connected to the lower end of a screw shaft 44 which passes through the gear casing cover plate 45. The upper end of the screw shaft 44 enters a threaded nut 46 which is firmly secured within a tubular member 47, the upper end of which is provided with an ear 48 pivotally connected to the lower portion 29 of the C-shaped arm 28 by the pivot pin 49. This top raising and lowering mechanism 35 is described and claimed in my co-pending application Serial No. 347,349, filed July 25, 1940, and its details form no part of the present invention.

Mounted on pivot pins 50 extending through ears 51 attached to the C-shaped arms 28 are the lower portions 52 of the rear top cross-bow 53. Spaced upwardly from the ear 51 and rigidly mounted upon the upper portion 31 of each C-shaped arm 28 is the curved lower end 54 of the intermediate top cross-bow 55, the latter being thus mounted in fixed relationship to the C-shaped arm 28. The latter also carries an ear 56 located adjacent the intermediate top cross-bow 55 and serving as a support for the pivot pin 57 upon which the rear top lever 58 is pivotally mounted intermediate its ends. Secured to the rearward end of the rear top lever 58 is the upper end of a coil sping 59, the lower end of which is secured as at 60 to the ear 51 (Fig. 2). This construction is likewise duplicated on opposite sides of the vehicle.

The forward end of each rear top lever is pivotally connected at 61 to the upper end of the pillar arm or pillar extension 62, the lower end of which is mounted on the pivot pin 63 supported by the bracket 64 which is adjustably mounted as at 65 on the horizontal body member 24. The adjustable mounting means 65 facilitates the adaptation of the top frame to the particular body during assembly operations, and compensates for variations in manufacture.

Also pivotally mounted on the pivot pin 61 is the rearward end of an intermediate outrigger 66, the latter carrying an ear 67 provided with a pivot pin 68 serving as a fulcrum for the forward top lever 69, the rearward end of which is pivotally secured to the pivot pin 70 mounted upon the upwardly extending post 71, the base 72 of which is rigidly mounted upon the upper end of the C-shaped rear arm 28 (Figure 2). The forward end of the forward lever 69 is pivotally connected as at 73 to the rearward end of the forward outrigger 74, the forward end of which is rigidly attached to the front top header 75. The forward outrigger 74 is intermediately provided with a bracket 76 carrying a pivot pin 77 to which is attached the forward end of a link 78, the rearward end of which is connected to the pivot pin 79 mounted upon the post 80 extending upwardly from and having its base portion 81 secured to the forward end of the intermediate outrigger 66. Also pivotally mounted on the pivot pin 79 is one end of the forward top cross bow 82, this construction likewise being duplicated on opposite sides of the vehicle. Interconnecting the front top header 75, the cross bows 82, 55 and 53 is a flexible top covering 83, the rearward lower edge of which is secured as at 84 to the cross portion 85 interconnecting the longitudinal body members 14.

The joints between the contacting ends of the forward and intermediate outriggers 74 and 66 and the forward ends of the C-shaped arms 28 are of special wedging construction, as shown in Fig. 7. The rearward end of the particular forward member 74 or 66 carries a member 86 secured thereto as at 87 and provided with an upwardly inclined V-notch 88. Movable downwardly into this V-notch 88 is a downwardly inclined V-shaped wedge portion 89 forming the forward part of the member 90 secured as at 91 to the forward end of the particular member 66 or 28, as the case may be (Fig. 7). Thus when pressure is exerted upon the rearwardly located member carrying the wedge-portion 89, the latter will be forced downwardly into the V-notch 88, thereby firmly locking the parts together so long as the pressure is maintained. The outriggers 74 and 66 and the upper portions 31 of the C-shaped rear arms 28 are preferably of channel cross-section, as indicated in Figures 4 and 5, thus greatly increasing their strength.

Operation of top using pillar arms

In the operation of the top frame shown in Figs. 1 to 7 inclusive, the energization of the motor 40 in one direction causes the screw shaft 44 of each unit 35 to rotate in a direction causing the tubular member 47 to move upward, swinging the lower portions 29 of the C-shaped arms 28 upward from the lowered position of Fig. 3, through the intermediate position of Fig. 2 to the fully raised position of Figure 1, pivoting around the pivot pins 26. As the C-shaped arms 28 move upward, the intermediate pivot pins 57 swing forward, transmitting this motion through the levers 58 to the pivot pins 61, causing the pillar arms 62 and intermediate outriggers 66 to swing in a forward direction (Fig. 2). Meanwhile, however, the pivot pins 70 at the upper ends of the C-shaped arms 28 swing forwardly at a more rapid rate than the pivot pins 57, being located at greater distances from the pivot pins 26 around which the C-shaped arms 28 are fulcrumed. As a consequence, the levers 69 transmit this more rapid motion to the mid-portions of the intermediate outriggers 66 at the pivot pins 68 thereof, causing the pivot pins 68 to move forwardly more rapidly than the pivot pins 61.

As a result of this motion, the pivot pins 79 adjacent the forward ends of the intermediate outriggers 66 move forward still more rapidly than the pivot pins 61 and 68, transmitting this maximum rapid motion through the links 78 to the pivot pins 77 at the mid-portions of the forward outriggers 74. The pivot pins 73 at the rearward ends of the forward outriggers are moved forward at a slower speed since their motion is transmitted through the lever 69 connected to the pivot pins 68 at the mid-portions of the intermediate outriggers 66. The final result is that the forward ends of the forward outriggers 74 carrying the forward top header 75 move downward more rapidly than the rearward ends thereof. Thus the overrunning of the motor 40 merely causes the top header 75 to be more firmly forced downwardly against the upper windshield header 23. The interlocking wedge joint construction shown in Fig. 7 serve to hold the outriggers 74 and 66 and the C-shaped arms 28 in firm engagement without looseness or play and consequently without rattling. This rattling caused by the loosening of the connections has been a serious disadvantage in prior foldable tops and is eliminated by the construction of the present invention.

To lower the top from the position of Figure 1 to that of Figure 3, the reversible motor 40 is energized in the opposite manner, causing it to rotate in the reverse direction. The consequent reverse rotation of the screw shaft 44 moves the nut 46 and the tubular member 47 downwardly. This swings the C-shaped arms 28 downwardly and rearwardly around their pivot pins 27 as fulcrums, causing the various links and levers to move in a reverse manner to that previously described. The members thus pass from the raised position of Fig. 1 through the intermediate position of Fig. 2 to the fully lowered position of Fig. 3.

Top structure without pillar arms

The modified top construction of Figs. 8 to 10 inclusive is generally similar in principle to the top construction of Figs. 1 to 7 inclusive, except that the pillar arms 62 are omitted in order to eliminate any interference with vision. Parts which are generally similar are designated with similar reference numerals, the comparison between the two forms being most conveniently made between Figs. 2 and 10 respectively. In the modified construction of Fig. 10, however, the rearward end of the rear top lever 58 is connected by the pivot pin 100 to the upper end of a link 101, the lower end of which is connected by the pivot pin 102 to the rearward end of an auxiliary lever 103, the forward end of which is pivoted at 104 to the swinging link 105 pivotally mounted at 106 upon the horizontal body frame member 24 (Fig. 10). At an intermediate pivot pin 107 the auxiliary lever 103 is pivotally connected to a point intermediate the ends of the lower portion 29 of the C-shaped arm 28. The pivot pin 49 in the modified construction of Figs. 8 to 10 inclusive is connected to the portion 29 of the C-shaped arm 28 as in the form shown in Figs. 1 to 7 inclusive.

The operation of the modified top of Figs. 8 to 10 inclusive is generally similar to that of the form shown in Figs. 1 to 7 inclusive. In the modified form, however, the upward motion of the tubular members 47 swings the C-shaped arms 28 upwardly around their pivots 26, likewise swinging the auxiliary levers 103 upwardly (Fig. 10). This swings the top members upwardly and forwardly in the manner previously described in connection with Figs. 1 to 7 inclusive.

The upward swinging of the auxiliary levers 103, however, moves the links 101 upward and forward, swinging the forward ends of the levers 58 downward and forward, thus performing the function of the swinging pillar arms without requiring the presence of the latter. At the same time, however, the forward ends of the intermediate outriggers 66 are moved downward and forward at a more rapid rate than their rearward ends, as previously described in connection with Figs. 1 to 7 inclusive, with the same result that the top front header 75 is forced downwardly into firm engagement with the upper windshield header 23. The same wedging action also occurs at the joints, as shown in Fig. 7, and the overrunning of the motors 40 merely results in the firmer uniting of the outriggers without buckling or collapsing. Due to the previously described construction, if the occupant of the vehicle pulls downward upon the forward outrigger 74 or intermediate outrigger 66, the parts will be more firmly wedged together instead of buckling or "breaking" as in prior art top frame constructions.

The lowering of the modified top shown in Figs. 8 to 10 inclusive accomplished by reversely energizing the reversible motors 40, causing the tubular members 47 to move downwardly and swinging the auxiliary levers 103 downwardly. This swings the lower portions 29 of the C-shaped rear arms 28 downwardly and at the same time pulls the links 101 downwardly, collapsing the top from the fully raised position of Figure 8 through the intermediate position of Fig. 10 into the fully lowered position of Fig. 9 in a manner which is the reverse of the action occurring in the raising of the top.

*Further modification with improved power transmission*

The modification shown in Fig. 11 is similar to that shown in Figs. 8 to 10 inclusive except that the assembly has been modified in its upper middle portion in order to transmit power more efficiently from the C-shaped arms 28, to the forward outriggers 74 and thereby force the front header 75 downwardly more firmly against the upper windshield header 23. This construction (Fig. 11) reduces the loss in power which occurs at the various joints, links and levers when the top approached its fully raised position. For this purpose, the rear top levers 58 are extended upwardly in bent portions 108 beyond their pivotal connections 61 with the rearward ends of the intermediate outriggers 66. The upper ends of the portions 108 are pivotally connected as at 109 to links 110, the opposite ends of which are pivotally connected as at 111 to rocking arms 112 pivotally mounted as at 113 upon brackets 114 secured to the forward ends of the intermediate outriggers 66. Also pivotally connected to the pivot pins 111 are the rearward ends of the links 78, the forward ends of which are pivotally connected as at 77 to the intermediate portions of the forward outriggers 74.

Thus in the modification of Fig. 11 an additional link 110 provides a direct connection between the forward end of each rear top lever 58 and each forward outrigger 74 by way of the swinging arm 112 and the link 78. The power is thus transmitted more directly and more efficiently than in the other form of the invention.

The operation of the further modified top of Fig. 11 is similar to that of Figs. 8 to 10 inclusive, as previously described. As the top moves upwardly toward its fully raised position, however, the upwardly bent portions 108 of the levers 58 swing forwardly in the manner of bell cranks, pushing the links 110 forwardly. This action swings the arms 112 forwardly and consequently moves the links 78 forwardly and downwardly, transmitting this motion to the forward outriggers 74 and forcing the forward top header 75 into firm engagement with the upper windshield header 23. The reverse operation occurs in an obvious manner when the motors 40 are reversed in order to lower the top. The remainder of the operation is similar to that described in connection with Figs. 8 to 10 inclusive and requires no further amplification.

While the invention has been shown and described in detail it is to be understood that the same is to be limited only by the appended claims for many changes may be made without departing from the spirit and scope of the invention.

What is claimed is:

1. In a foldable top structure for a vehicle body with windows and a windshield, a forward outrigger engageable with the windshield, an intermediate outrigger engageable with said forward outrigger, a sector shaped rear top frame member pivoted to said body adapted to overlie one of said windows, means connecting the rearward end of said intermediate outrigger to said sector shaped rear top frame member, an upper lever pivotally connected near its forward end to the rearward end of said forward outrigger and near its rearward end to said sector shaped rear top frame member and intermediately fulcrumed on said intermediate outrigger, and a lever pivotally connecting the forward portion of said intermediate outrigger with the intermediate portion of said forward outrigger.

2. In a foldable top structure for a vehicle body with windows and a windshield, a forward outrigger engageable with the windshield, an intermediate outrigger engageable with said forward outrigger, a sector shaped rear top frame member pivoted to said body adapted to overlie one of said windows, means connecting the rearward end of said intermediate outrigger to said sector shaped rear top frame member, an upper lever pivotally connected near its forward end to the rearward end of said forward outrigger and near its rearward end to said sector shaped rear top frame member and intermediately fulcrumed on said intermediate outrigger, and a lever pivotally connecting the forward portion of said intermediate outrigger with the intermediate portion of said forward outrigger.

3. In a foldable top structure for a vehicle body with windows and a windshield, a forward outrigger engageable with the windshield, an intermediate outrigger engageable end to end with said forward outrigger, a sector shaped rear top frame member pivoted to said body adapted to swing above one of said windows, means connecting the rearward end of said intermediate outrigger to said sector shaped rear top frame member, an upper lever pivotally connected near its forward end to the rearward end of said forward outrigger and near its rearward end to said sector shaped rear top frame member and intermediately fulcrumed on said intermediate outrigger, and a lever pivotally connecting the forward portion of said intermediate outrigger with the intermediate portion of said forward outrigger.

4. In a foldable top structure for a vehicle body with windows and a windshield, a forward outrigger engageable with the windshield, an intermediate outrigger engageable with said forward outrigger, a sector shaped rear top frame member pivoted to said body to swing upwardly along the rearward edge of said window, means connecting the rearward end of said intermediate outrigger to said rear top frame member, an upper lever pivotally connected near its forward end to the rearward end of said forward outrigger and near its rearward end to said sector shaped rear top frame member and intermediately fulcrumed on said intermediate outrigger, and a lever pivotally connecting the forward portion of said intermediate outrigger with the intermediate portion of said forward outrigger.

5. In a foldable top structure for a vehicle body with front and rear windows and a windshield, a forward outrigger engageable with the windshield, an intermediate outrigger engageable with said forward outrigger, a sector shaped rear top frame member pivoted to said body to swing upwardly along the rearward edge of said window, means connecting the rearward end of said intermediate outrigger to said sector shaped rear top frame member, an upper lever pivotally connected near its forward end to the rearward end of said forward outrigger and near its rearward end to said sector shaped rear top frame member and intermediately fulcrumed on said intermediate outrigger, and a lever pivotally connecting the forward portion of said intermediate outrigger with the intermediate portion of said forward outrigger, said forward and intermediate outriggers extending along the top edge of said forward window and said rear top frame member extending upward along the rearward edge of said rear window.

6. In a foldable top structure for a vehicle body with front and rear windows and a windshield, a forward outrigger engageable with the windshield, an intermediate outrigger engageable with said forward outrigger, a sector shaped rear top frame member pivoted to said body to swing to a position above the rear window, means connecting the rearward end of said intermediate outrigger to said sector shaped rear top frame member, an upper lever pivotally connected near its forward end to the rearward end of said forward outrigger and near its rearward end to said sector shaped rear top frame member and intermediately fulcrumed on said intermediate outrigger, and a link pivotally connecting the forward portion of said intermediate outrigger with the intermediate portion of said forward outrigger, said rear window having an upwardly and forwardly curved rearward edge, said forward and intermediate outriggers extending along the top edge of said forward window and said sector shaped rear top frame member extending upwardly along said upwardly and forwardly curved edge of said rear window.

7. In a foldable top structure for a vehicle body with front and rear windows and a windshield, a forward outrigger engageable with the windshield, an intermediate outrigger engageable with said forward outrigger, a sector shaped rear top frame member pivoted to said body, means connecting the rearward end of said intermediate outrigger to said sector shaped rear top frame member, an upper lever pivotally connected near its forward end to the rearward end of said forward outrigger and near its rearward end to said sector shaped rear top frame member and intermediately fulcrumed on said intermediate outrigger, and a lever link pivotally connecting the forward portion of said intermediate outrigger with the intermediate portion of said forward outrigger, said rear window having an upwardly and forwardly curved rearward edge, said forward and intermediate outriggers extending along the top edge of said forward window and said sector shaped rear top frame member being of approximately C-shaped outline and extending along the upwardly and forwardly curved rearward edges of said rear window.

8. In a foldable top structure for a vehicle body with windows and a windshield, a forward outrigger engageable with the windshield, an intermediate outrigger engageable with said forward outrigger, a sector shaped rear top frame member pivoted to said body to swing above one of said windows, means connecting the rearward end of said intermediate outrigger to said sector shaped rear top frame member, an upper lever pivotally connected near its forward end to the rearward end of said forward outrigger and near its rearward end to said rear top frame member and intermediately fulcrumed on said intermediate outrigger, a lever pivotally connecting the forward portion of said intermediate outrigger with the intermediate portion of said forward outrigger, and means on said sector shaped rear top frame member adjacent its arcuate portion for applying power to raise said top structure.

9. In a foldable top structure for a vehicle body with front and rear windows and a windshield, a forward outrigger engageable with the windshield, an intermediate outrigger engageable with said forward outrigger, a sector shaped rear top frame member pivoted to said body to swing above the rear window, means connecting the rearward end of said intermediate outrigger to said sector shaped rear top frame member, an upper lever pivotally connected near its forward end to the rearward end of said forward outrigger and near its rearward end to said sector shaped rear top frame member and intermediately fulcrumed on said intermediate outrigger, a lever pivotally connecting the forward portion of said intermediate outrigger with the intermediate portion of said forward outrigger, said rear window having an upwardly and forwardly curved rearward edge, said forward and intermediate outriggers extending along the top edge of said forward window and said sector shaped rear top frame member being of approximately C-shaped outline and extending along the upwardly and forwardly curved rearward edges of said rear window, and a connection on said sector shaped rear top frame member adjacent its arcuate portion for applying power thereto for raising the said top structure.

10. In a foldable top structure for a vehicle body with body pillars and front and rear windows and a windshield, a forward outrigger engageable with the windshield, an intermediate outrigger engageable with said forward outrigger, a sector shaped rear top frame member pivoted to said body adapted to swing over the rear window, means connecting the rearward end of said intermediate outrigger to said sector shaped rear top frame member, an upper lever pivotally connected near its forward end to the rearward end of said forward outrigger and near its rearward end to said sector shaped rear top frame member and intermediately fulcrumed on said intermediate outrigger, a lever pivotally connecting the forward portion of said intermediate outrigger with the intermediate portion of said forward outrigger, and a pillar-extension pivotally mounted on said body and pivoted to said intermediate outrigger.

11. In a foldable top structure for a vehicle body with body pillars and front and rear windows and a windshield, a forward outrigger engageable with the windshield, an intermediate outrigger engageable with said forward outrigger, a sector shaped rear top frame member pivoted to said body to swing above one of said rear windows, means connecting the rearward end of said intermediate outrigger to said sector shaped rear top frame member, an upper lever pivotally connected near its forward end to the rearward end of said forward outrigger and near its rearward end to said sector shaped rear top frame member and intermediately fulcrumed on said intermediate outrigger, a lever pivotally connecting the forward portion of said intermediate outrigger with the intermediate portion of said forward outrigger, and a pillar-extension pivotally mounted on said body and pivoted to said intermediate outrigger at a location adjacent the rearward end thereof.

12. In a foldable top structure for a vehicle body with front and rear windows and a windshield, a forward outrigger engageable with the windshield, an intermediate outrigger engageable with said forward outrigger, a rear top frame member pivoted to said body, a fulcrum lever having one end connecting the rearward end of said intermediate outrigger and its intermediate portion connected to said rear top frame member, an upper lever pivotally connected near its forward end to the rearward end of said forward outrigger and near its rearward end to said rear top frame member and intermediately fulcrumed on said intermediate outrigger, a lever pivotally connecting the forward portion of said intermediate outrigger with the intermediate portion of said forward outrigger, said rear window having an upwardly and forwardly directed rearward edge, said forward and intermediate outriggers extending along the top edge of said forward window and said rear top frame member extending upwardly along said upwardly and forwardly directed edge of said rear window, a lower lever pivotally mounted on said body and intermediately pivoted to the lower portion of said rear top frame member, and a link pivotally connecting the opposite end of said lower lever with the rearward end of said fulcrum lever.

13. In a foldable top structure for a vehicle body with front and rear windows and a windshield, a forward outrigger engageable with the windshield, an intermediate outrigger engageable with said forward outrigger, a rear top frame member pivoted to said body, a fulcrum lever having one end connecting the rearward end of said intermediate outrigger and its intermediate portion connected to said rear top frame member, an upper lever pivotally connected near its forward end to the rearward end of said forward outrigger and near its rearward end to said rear top frame member and intermediately fulcrumed on said intermediate outrigger, a lever pivotally connecting the forward portion of said intermediate outrigger with the intermediate portion of said forward outrigger, said rear window having an upwardly and forwardly directed rearward edge, said forward and intermediate outriggers extending along the top edge of said forward window and said rear top frame member extending upwardly along said upwardly and forwardly directed edge of said rear window, a lower lever pivotally mounted on said body and intermediately pivoted to the lower portion of said rear top frame member, and a link pivotally connecting the opposite end of said lower lever with the rearward end of said fulcrum lever, said link being disposed rearwardly of said rear top frame member and the rearward edge of said rear window.

14. In a foldable top structure for a vehicle body with front and rear windows and a windshield, a forward outrigger engageable with the windshield, an intermediate outrigger engageable with said forward outrigger, a rear top frame member pivoted to said body, a fulcrum lever having one end connecting the rearward end of said intermediate outrigger and its intermediate portion connected to said rear top frame member, an upper lever pivotally connected near its forward end to the rearward end of said forward outrigger and near its rearward end to said rear top frame member and intermediately fulcrumed on said intermediate outrigger, a lever pivotally connecting the forward portion of said intermediate outrigger with the intermediate portion of said forward outrigger, said rear window having an upwardly and forwardly directed rearward edge, said forward and intermediate outriggers extending along the top edge of said forward window and said rear top frame member extending upwardly along said upwardly and forwardly directed edge of said rear window, a lower lever pivotally mounted on said body and intermediately pivoted to the lower portion of said rear top frame member, and a link pivotally connecting the opposite end of said lower lever with the rearward end of said fulcrum lever, and a connection on said lower lever for applying power thereto for raising said top structure.

15. In a foldable top structure for a vehicle body with windows and a windshield, a forward outrigger engageable with the windshield, an intermediate outrigger engageable with said forward outrigger, a rear top frame member pivoted to said body, link connecting the rearward end of said intermediate outrigger to said rear top frame member, an upper lever pivotally connected near its forward end to the rearward end of said forward outrigger and near its rearward end to said rear top frame member and intermediately fulcrumed on said intermediate outrigger, a lever pivotally connecting the forward portion of said intermediate outrigger with the intermediate portion of said forward outrigger and a pusher link connecting said lever with said link means adjacent its connection with the rearward end of said intermediate outrigger.

16. In a foldable top structure for a vehicle body with front and rear windows and a windshield, a forward outrigger engageable with the windshield, an intermediate outrigger engageable end to end with said forward outrigger and having an upward extension, a forward link connecting said upward extension with the intermediate portion of said forward outrigger, a rear top frame member pivoted to said body adapted to swing upwardly along the rearward edge of said rear window, an upper lever pivoted intermediately to said intermediate outrigger, and pivoted at one end to said forward outrigger and at its other end to said rear top frame member, a lever system pivotally connecting the rearward end of said intermediate outrigger with said rear top frame member, and a pusher link connecting said forward link with said lever system adjacent the pivoted connection between said intermediate outrigger and said rear top frame member.

17. In a foldable top structure for a vehicle body with front and rear windows and a windshield, a forward outrigger engageable with the windshield, an intermediate outrigger engageable end to end with said forward outrigger and having an upward extension, a forward link connecting said upward extension with the intermediate portion of said forward outrigger, a rear top frame member pivoted to said body to swing upwardly along the rearward edge of said rear window, an upper lever pivoted intermediately to said intermediate outrigger, and pivoted at one end to said forward outrigger and at its other end to said rear top frame member, a lever system pivotally connecting the rearward end of said intermediate outrigger with said rear top frame member, and a pusher link connecting said forward link at the point of its connection with the upward extension with said lever system at its point of connection with said intermediate outrigger.

18. In a foldable top structure for a vehicle body with front and rear windows and a windshield, a forward outrigger engageable with the windshield, an intermediate outrigger engageable end to end with said forward outrigger, and having an upward extension, a forward link connecting said upward extension with the intermediate portion of said forward outrigger, a rear top frame member pivoted to said body and extending upwardly along the rearward edge of said rear window, an upper lever pivoted intermediately to said intermediate outrigger, and pivoted at one end to said forward outrigger and at its other end to said rear top frame member, a lever system pivotally connecting the rearward end of said intermediate outrigger with said rear top frame member, a pusher link connecting said forward link at its point of connection to said upward extension with said lever system adjacent the connection between the intermediate outrigger and said lever system, and a connection on said lever system for applying power thereto for raising said top structure.

19. In a foldable top structure for a vehicle body with front and rear windows and a windshield, a forward outrigger engageable with the windshield, an intermediate outrigger engageable end to end with the said forward outrigger and having an upward extension, a forward link connecting said upward extension with the intermediate portion of said forward outrigger, a rear top frame member pivoted to said body to swing upwardly along the rearward edge of said rear window, an upper lever pivoted intermediately to said intermediate outrigger, and pivoted at one end to said forward outrigger and at its other end to said rear top frame member, a rear lever pivotally mounted on said rear top frame member and pivotally connected at its forward end to said intermediate outrigger, a lower lever pivotally mounted near one end on said body and intermediately pivoted to a lower portion of said rear top frame member, a link connecting the opposite end of said lower lever to the rearward end of said rear lever, and a pusher link connecting said forward link with said rear lever adjacent its connection with the intermediate outrigger.

ISABEL D. WESTROPE.
*Administratrix of the Estate of Frederick J. Westrope, Deceased.*